United States Patent [19]

Schleappe

[11] 4,227,424
[45] Oct. 14, 1980

[54] UNIVERSAL DRIVE BELT

[76] Inventor: Alvin E. Schleappe, Star Rte. 1, Box 212, Fredericktown, Mo. 63645

[21] Appl. No.: 956,890

[22] Filed: Nov. 2, 1978

[51] Int. Cl.³ ............................. F16B 7/00; F16G 9/00
[52] U.S. Cl. ..................................... 474/256; 24/31 B; 403/229; 403/292
[58] Field of Search ............... 74/231 J, 238; 24/31 B, 24/38; 206/223; 403/229, 292, 296

[56] References Cited

U.S. PATENT DOCUMENTS

| | | | |
|---|---|---|---|
| 2,001,835 | 5/1935 | Cook | 74/238 X |
| 2,288,669 | 7/1942 | Atkinson | 74/238 X |
| 3,345,095 | 10/1967 | Hohenberger | 403/292 |
| 3,501,971 | 3/1970 | Peterson | 74/231 J |
| 3,922,759 | 12/1975 | Mabie | 74/231 J X |
| 4,051,741 | 10/1977 | Marczewski | 74/231 J |
| 4,070,119 | 1/1978 | Duer | 403/292 X |

FOREIGN PATENT DOCUMENTS 530303 12/1940 United Kingdom ....................... 74/238

Primary Examiner—Lawrence J. Staab
Attorney, Agent, or Firm—Rogers, Eilers & Howell

[57] ABSTRACT

A universal drive belt includes a hollow flexible tubing which may be cut to proper length and a fastener for joining together the ends thereof. The fastener includes a medial portion in the shape of a helically wound coiled spring with a hooked head formed at each end thereof. The hooked heads are slightly larger than the internal diameter of the tubing and have a pointed tip which digs into the side-wall for anchoring the fastener and preventing its removal. The coiled spring medial portion allows twisting and flexing of the ends of the hollow tubing during use without damage or loosening of the fastener. The universal drive belt may be rapidly and easily installed without the use of tools.

4 Claims, 5 Drawing Figures

UNIVERSAL DRIVE BELT

BACKGROUND AND SUMMARY

Drive belts are quite commonly used to transmit power from motors and the like through gears or pulleys. These endless belts may be used to drive many types of powered devices including fans, generators, and other similar devices. A common usage is in the typical automobile where three or more belts may be used to drive such powered accessories as an air conditioner, power steering, power brakes, and other accessories. Belts are also used to drive the generator, and the fan which draws air in through the radiator to aid in cooling the engine. These drive belts are essential for the continuous operation of an automobile and if one of these should happen to break, the operator of the automobile may be stranded or experience a significant delay in his travel while the broken belt is replaced. Therefore, it would be very convenient to have a device which could be used as a substitute for these more important belts and which would be easy to install.

This problem has been recognized and there have been attempts at developing a replacement belt which is adjustable for use in a wide variety of lengths and which can be installed without the aid of special tools or the like usually unavailable to the typical traveller. Some of these include belts which have a wire mesh structure and a male connector with barbs (Jackson U.S. Pat. No. 3,788,156), a hollow tube with an insert coupling having external circular ribs (Peterson U.S. Pat. No. 3,501,971), a belt constructed of sections having a hollow female end and a toothed and pronged male end (Stirton U.S. Pat. No. 3,777,586), a tie strip with a plurality of louvered tongues to join the ends of belt stock (Schott U.S. Pat. No. 2,300,706), a belt connector with a flexible biting edge to fit into the ends of a hollow tube (Ogasawara, et al, U.S. Pat. No. 3,922,756), a continuous belt having a male and female end which requires glue (Beck U.S. Pat. No. 4,031,766), and one drive belt consisting entirely of a helically wound coiled spring (Gear U.S. Pat. No. 227,163). Most of these prior art devices require a specialized connector which is expensive to manufacture and which generally has a shoulder formed therein for insertion into a smaller diameter hollow tube. These connectors allow the rotation of the hollow tube relative to the connector and to the other end of the tube, which contributes to an increased wearing and shorter life. Furthermore, some of these devices are difficult to install because they require intricate structures to be matched up before insertion or even the application of glue. It should be remembered that most often, all that is available is a weak flashlight to provide light beneath the hood of the car. Therefore, it is important that installation can be easily accomplished with a minimum of effort and without the need of tools or meticulous handiwork.

Applicant has developed a universal replacement drive belt which is significantly less costly to produce, much easier to install and which has improved features over those available in the prior art. Applicant's drive belt includes a wire wound fastener having a semi-circular hooked head formed at each end thereof. These hooked heads slide easily into the hollow tube portion of the drive belt, even though they are slightly larger than the internal diameter of the hollow tube. This is possible becaue the hollow tube can bulge at the two places where the head contacts the tube whereas the prior art devices using connectors having oversized circular shoulders must bulge the entire circumference out of shape. This makes insertion of these prior art devices much more difficult, limits the diameter of the shoulders and therefore its holding power.

Once applicant's fastener is inserted, the hooked head serves a second purpose by digging into the sidewall of the hollow tube and anchoring the fastener in position. Thus, applicant's hollow tube and fastener may not be rotated with respect to each other while the prior art devices may be rotated unless they are fixed with glue or some other interlocking structure. The medial portion of the fastener is a helically wound coiled spring which permits the fastener and tubing to flex and twist with respect to each other but also provides a force which tends to return them to their original positions. In the prior art, these connectors are rigid and provide no flexing between the various parts so that any twisting or pulling forces tend to loosen the connector as the belt is used.

These and other advantages of applicant's universal drive belt may be more fully understood by referring to the drawings and description of the preferred embodiment which follows.

DETAILED DESCRIPTION OF THE PREFERRED EMBODIMENT

Applicant's universal drive belt 20 includes a length of hollow flexible reinforced tubing 22 and a coiled spring-like fastener 24 which is used to join together the ends of tubing 22. Tubing 22 may be constructed of any materials suitable for use as a drive belt including nylon reinforced rubber or neoprene and the like. Fiber reinforcing 26 may be stitched through the tubing 22 and also cover the outer surface thereof to provide a roughened surface to minimize the tendency of the belt 20 to slip.

Figure 1:
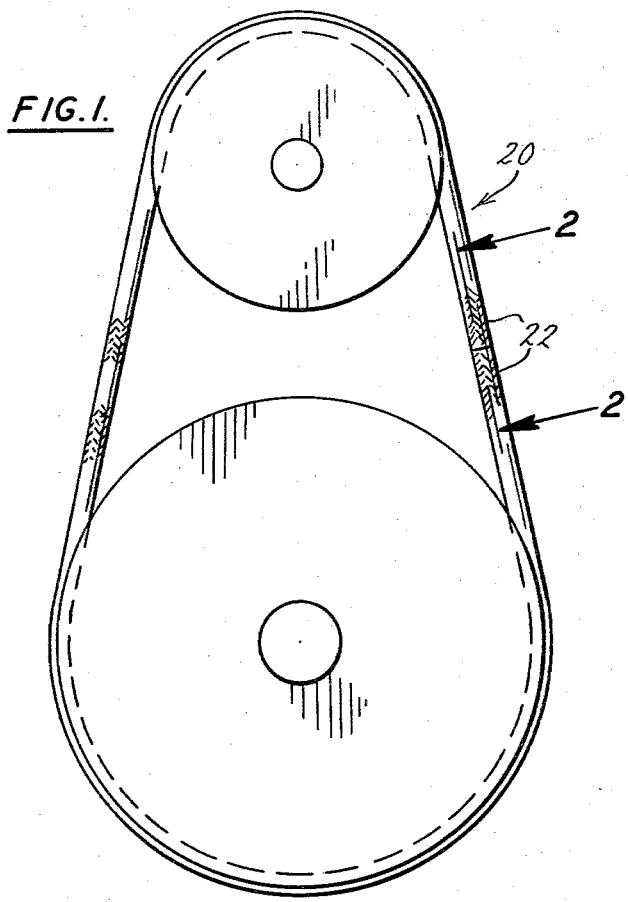
FIG. 1 is a front elevational view showing a typical pair of pulleys with applicant's drive belt installed.
Figure 2:
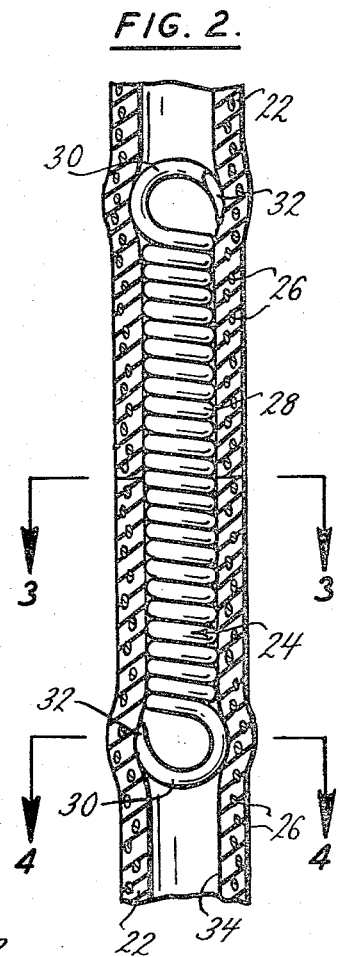
FIG. 2 is a cross-sectional view taken along the plane of line 2—2 in FIG. 1 and detailing the fastener.
Figure 5:
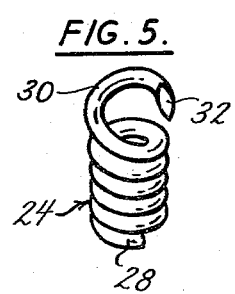
FIG. 5 is a partially broken away view detailing the hooked head of the fastener.
Figure 4:
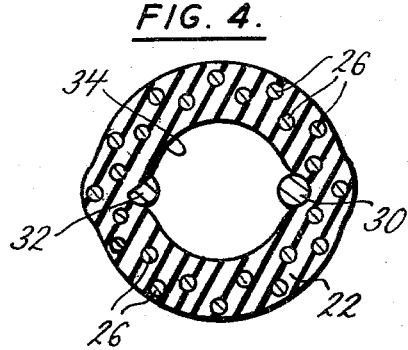
FIG. 4 is a cross-sectional view taken along the plane of line 4—4 in FIG. 2 and detailing the hooked head of the fastener digging into the tubing.
Figure 3:
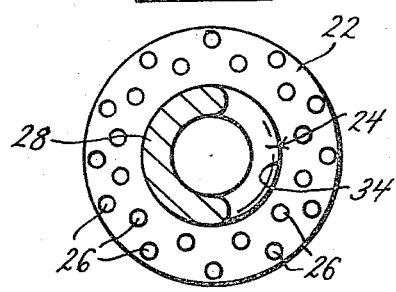
FIG. 3 is a cross-sectional view taken along the plane of line 3—3 in FIG. 2 and detailing the tubing and fastener.

The fastener 24 has a helically wound medial portion 28 and a hooked head 30 formed at either end thereof. As best shown in FIGS. 2 and 4, the hooked heads 30 deform the tubing 22 only at the position where they are in direct contact which allows for that portion of the tubing 22 to flex and permit the easy insertion thereof. A pointed tip 32 is formed at the end of each hooked head 30 and digs into the inner sidewall 34 to prevent the fastener 24 from being removed from tubing 22 after it has been inserted therein. The pointed tip 32 is oriented to provide no resistance to insertion of fastener 24 but will dig into sidewall 34 and effectively anchor the hooked head 30 in a fixed position within the tubing 22.

After the fastener 24 has been inserted in both ends of tubing 22, the hooked heads 30 with their pointed tips 32 anchor the end of fastener 24 in a fixed orientation with respect to each end of tubing 22 but the medial coiled spring portion 28 does allow some flexing of the opposite ends of tubing 22 in response to torques and twisting moments of force which are encountered during use. Thus, medial portion 28 provides for sufficient flexing to minimize any tendency of the hooked heads 30 and pointed tips 32 to loosen during use, which substantially increases the operating life of drive belt 20 over those of the prior art.

Operation

Applicant's universal drive belt 20 is relatively inexpensive and may be used for many applications, one of which is in the automobile. It is anticipated that applicant's universal drive belt 20 would be inexpensive enough for an owner to carry one around in his car for emergency purposes. Then, when a drive belt breaks in an inopportune moment, applicant's universal drive belt 20 may be installed to permit the owner to continue his travel with only a slight inconvenience and delay.

Firstly, the length of tubing 22 must be measured and cut to the proper length which may be determined in any suitable manner including matching the tubing 22 with the broken belt, or if the broken belt is no longer available, by wrapping the universal drive belt 20 about the pulleys. After the tubing 22 has been cut to length, the broken belt must be removed and the pulleys inspected and cleaned of any debris. The fastener 24 is then inserted in one end of tubing 22 until approximately half of the fastener 24 remains exposed. The tubing 22 is then threaded around the pulleys. A careful visual inspection should be made to ensure that the tubing 22 has been threaded properly and is seated correctly in the pulley grooves. At this time, the other end of fastener 24 may then be inserted into the corresponding end of tubing 22 and this should result in the ends of tubing 22 becoming butted against each other and the fastener 24 being completely covered by tubing 22.

After these simple operations have been completed, applicant's universal drive belt 20 is installed and ready to operate in place of the broken belt. It should be noted that installation was accomplished without removing any of the existing belts and that there is no requirement to loosen and tighten pulleys or change their positions. This eliminates the requirement for ratchets, wrenches or the like and the only tools required to install applicant's universal drive belt 20 is a sharp knife to cut the tubing 22.

Various changes and modifications to applicant's device would be apparent to one of ordinary skill in the art. These changes and modifications are included in applicant's teaching and he intends that his invention be imited only by the scope of the claims appended hereto.

What is claimed is:

1. A kit for assembling an endless drive belt of adjustable length comprising:
    a length of flexible reinforced tubing, said tubing having a sidewall defining a hollow core extending along at least part of the interior thereof, and
    a fastener including a length of coiled spring, a semicircular head formed in each end thereof, the diameter of said heads being larger than the diameter of said hollow core, said heads having means to resist removal from said hollow core after being inserted thereinto including a pointed tip formed into the end of said head, said pointed tip being oriented to slide freely into the hollow core but dig into the sidewall in response to a force tending to remove said head from said tubing, said pointed tips cooperating with said coiled spring to resiliently resist rotation of one end of tubing with respect to said spring and the other end of tubing.

2. The device of claim 1 wherein said fastener is approximately one and a half inches long, has a diameter of approximately one quarter inch, and each head has a diameter of approximately five eighths inches and said hollow core has a diameter of approximately one quarter inch.

3. An endless drive belt for use as a fan belt or the like comprising:
    a length of flexible reinforced tubing, said tubing having a sidewall defining a hollow core extending along at least part of the interior thereof, said tubing having its ends fastened together with a fastener, said fastener including a length of coiled spring, a semicircular head formed in each end thereof, the diameter of said heads being larger than the diameter of said hollow core, said heads having means to resist removal from said hollow core including a pointed tip formed into the end of said head, said pointed tip being oriented to slide freely into the hollow core but dig into the sidewall in response to a force tending to remove said head from said tubing, said pointed tips cooperating with said coiled spring to resiliently resist rotation of one end of tubing with respect to said spring and the other end of tubing.

4. The device of claim 3 wherein said fastener is approximately one and a half inches long, has a diameter of approximately one quarter inch, and each head has a diameter of approximately five eighths inches and said hollow core has a diameter of approximately one quarter inch.

* * * * *